Jan. 26, 1960 J. H. BERTIN 2,922,277
DEVICE FOR INCREASING THE MOMENTUM OF A FLUID ESPECIALLY
APPLICABLE AS A LIFTING OR PROPULSION DEVICE
Filed Nov. 28, 1956 4 Sheets-Sheet 1
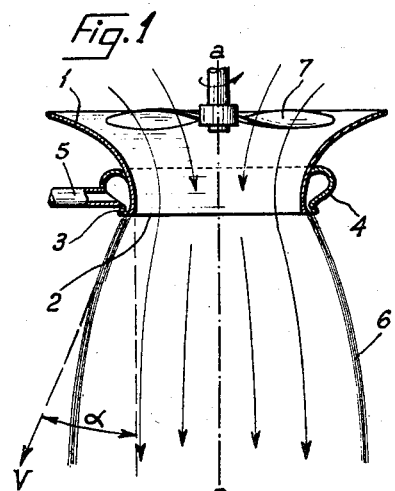
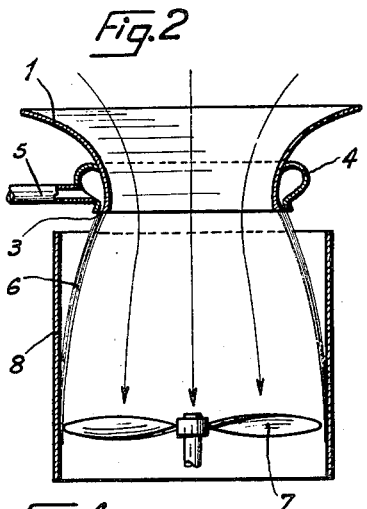
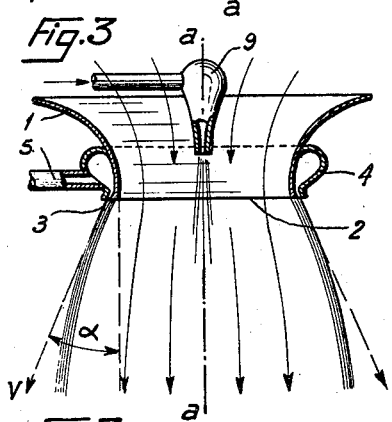
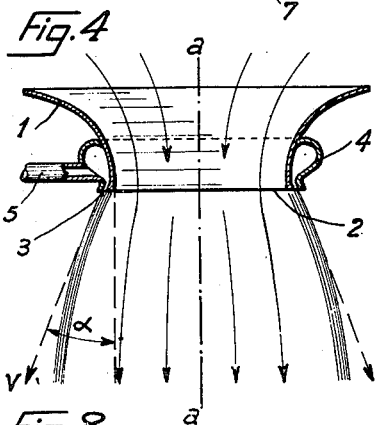
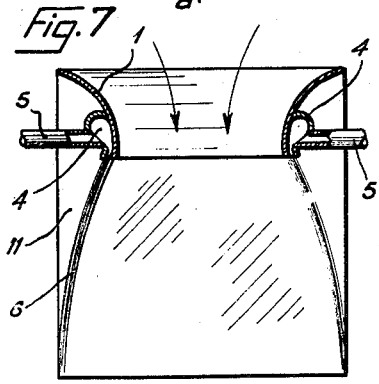
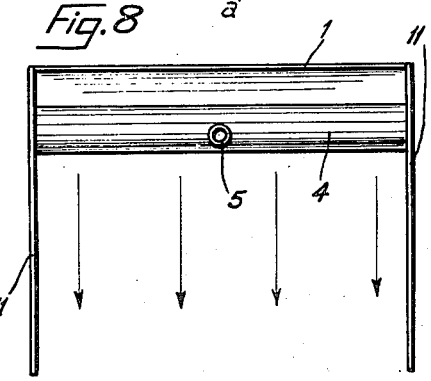
INVENTOR
JEAN H. BERTIN
By
Watson, Cole, Grindle & Watson
ATTORNEYS

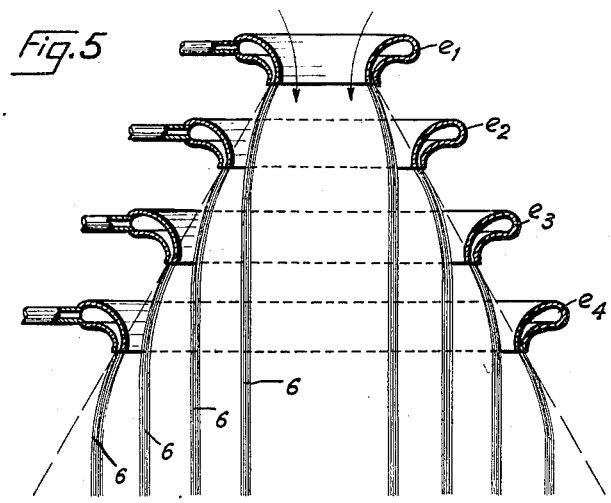
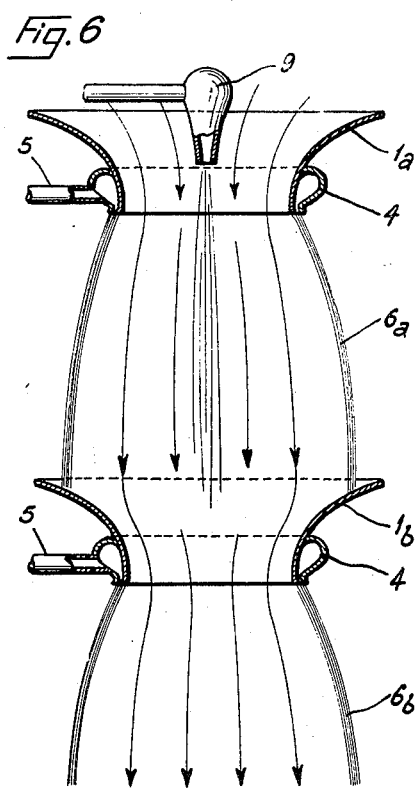
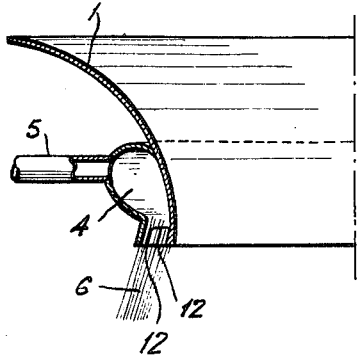

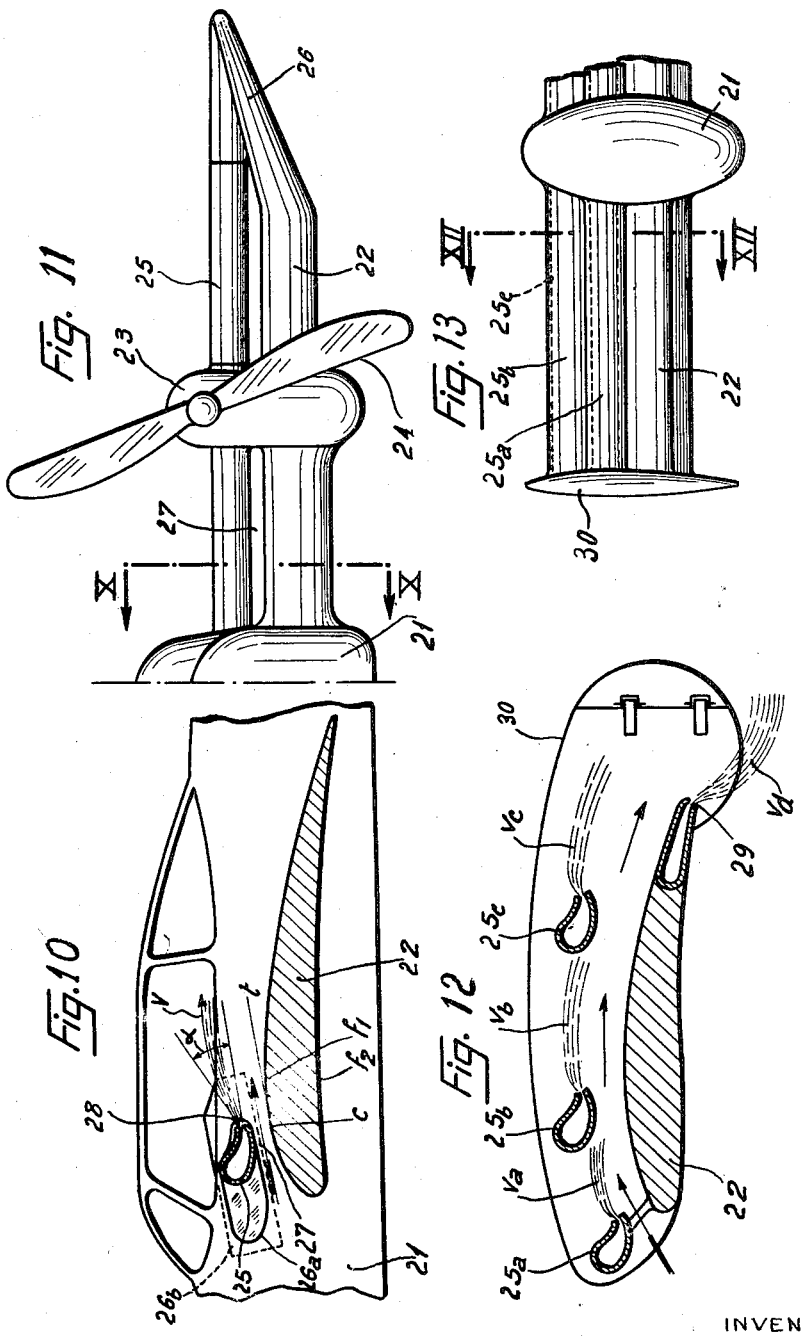

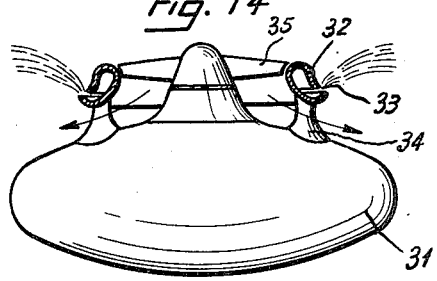
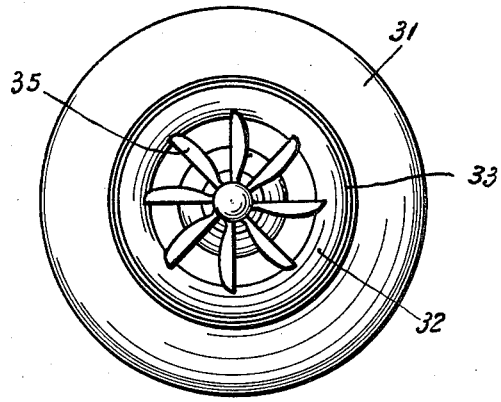
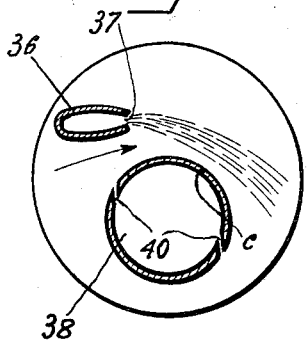
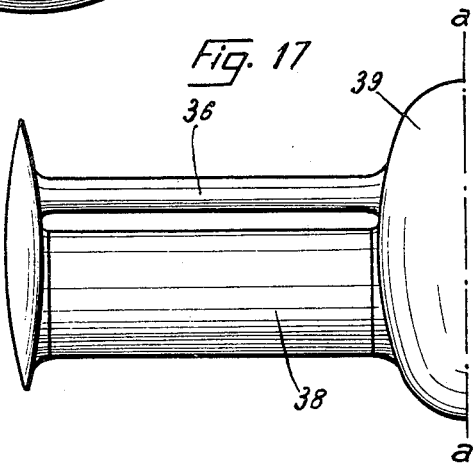

United States Patent Office 2,922,277
Patented Jan. 26, 1960

1

2,922,277

DEVICE FOR INCREASING THE MOMENTUM OF A FLUID ESPECIALLY APPLICABLE AS A LIFTING OR PROPULSION DEVICE

Jean H. Bertin, Neuilly-sur-Seine, France, assignor to Société Bertin & Cie (Société à Responsabilité Limitée), Paris, France, a French company Application November 28, 1956, Serial No. 624,811

Claims priority, application France November 29, 1955

9 Claims. (Cl. 60—35.5)

The present invention has for its object a device for increasing the momentum of a flow of fluid which is particularly applicable as a lifting or propulsion device, especially for the vertical take-off of aircraft.

This apparatus is characterised by the combination of a convergent tube which accelerates the fluid up to speed, and a divergent portion which serves to reduce the speed, the said divergent portion being constituted by a fluid screen produced by the discharge of a fluid under pressure through a nozzle in the form of a suitable-directed slot arranged on the solid convergent tube.

The rate of flow of fluid in the convergent portion may be obtained solely by the entraining action of the fluid screen divergent, but in order to increase the rate of flow and the thrust it is an advantage to employ an auxiliary entraining means such as a fan or an inducer jet.

While with a convergent-divergent nozzle of the usual type, it is not possible to utilise the great momentum possessed by the fluid at the neck, this momentum being reduced in the divergent portion which is physically and rigidly fixed to the convergent portion, the fact that the divergent portion of the apparatus in accordance with the invention is a fluid screen without mechanical coupling with the convergent portion enables the high speed reached at the neck by the fluid to be employed as a reaction. When installed vertically, the apparatus thus permits the construction of a simple and efficient lifting device for aircraft or again a main or auxiliary propulsion unit for aircraft and aeroplanes which take-off vertically.

The divergent may furthermore be formed only partly by a fluid screen and may comprise a solid portion asymmetrically placed with respect to the axis of the main flow.

On the other hand, a part of the wall of the convergent may also be formed by a fluid screen, which enables a useful effort to be obtained on the solid part of the wall of the convergent.

The description which follows below with reference to the accompanying drawings (which are given by way of example only and not in any sense by way of limitation) will make it clear how the invention may be carried into effect, the special features which are brought out, either in the text or in the drawings, being understood to form a part of the said invention.

Figs. 1 to 7 are axial views in diagrammatic cross-section of various forms of embodiment of the invention.

Fig. 8 is a view in elevation of the apparatus which is shown in cross-section in Fig. 7.

Fig. 9 is a half-section to a larger scale of a form of embodiment of a nozzle which serves to produce the fluid divergent.

2

Figs. 10 and 11 show a side view with partial cross-section and an end view of one form of embodiment of the invention as applied to increasing the lift of an aircraft wing.

Figs. 12 and 13 are similar views of a further form of embodiment suitable for the same type of application.

Figs. 14 and 15 show a view in elevation and a view in plan of a flying machine which can take-off vertically.

Figs. 16 and 17 show two vertical projections at 90° from each other, of a further form of embodiment in which a part of the wall of the convergent is also formed by a fluid screen.

The apparatus shown in Fig. 1 comprises a convergent portion 1 with a solid wall, which may for example be a body of revolution around an axis $a$—$a$, but which may also have any desired form, as will be indicated below. Around the neck 2 of this convergent portion is formed a nozzle 3 in the shape of an annular slot supplied by means of a collector 4 and a piping system 5 with fluid under pressure derived from a suitable source. As it is expelled through the slot, this fluid produces a jet 6 in the form of a screen which acts as an extension of the physical wall of the convergent portion 1. The slot 3 is directed in such manner that the stream of fluid at its outlet makes an acute angle $\alpha$ with the axis $a$—$a$, the fluid screen 6 discharged from the slot thus constituting a divergent wall forming a continuation of the physical convergent wall which terminates at the neck 2. This fluid screen, which is tangential at its origin to a cone of revolution having an apex angle $2\alpha$ in the case in which the convergent 1 is itself a body of revolution, or which in any case is enclosed at its origin by the initial speeds V of the various streams of fluid discharged from the slot, becomes curved in accordance with the differences of pressure in the two zones of space which it separates. Thus in the case in which the apparatus is surrounded by atmospheric air so that it delivers the air taken from the atmosphere on the upstream side of the convergent and again discharged into the atmosphere on the downstream side of the fluid divergent, the fluid screen assumes a shape similar to that shown in Fig. 1. While it is divergent at the origin, by virtue of the orientation of the slot, it tends to become cylindrical owing to the effect of the higher exterior pressure.

The setting in motion of the fluid of the surrounding medium in the direction of the arrows is obtained by means of a small fan or a screw 7 which delivers into the intake of the convergent 1 and the driving energy of which does not require to be considerable.

In order to give an idea, if for example the apparatus installed is considered as having its axis $a$—$a$ vertical and at first motionless in the atmosphere, the fan 7 produces a movement of air towards the convergent. During its passage through the convergent, the speed of the air increases up to a maximum which is reached at the neck. In the fluid divergent, this speed is reduced while at the same time the pressure which had been reduced at the neck again rises to the value of the atmospheric pressure which the air possessed before its passage into the convergent, this diffusion in the fluid divergent taking place, furthermore, with a good efficiency by virtue of the absence of the reduction of the boundary layers which are observed in divergents having solid walls. The wall of the convergent is subjected externally to atmospheric pressure, while internally it is subjected to a depression which increases from the intake of the convergent up to the neck, with the exception of the small portion of the intake surface at which the action of the fan 7 may create a higher pressure. In any case, the resultant of the absolute pressures on the internal wall and on the external wall is a force which is directed upwards and which tends in consequence to lift the convergent and the members which are associated with it. To this force, which is produced by virtue of the existence of the fluid divergent, and which would be annulled by a force in the opposite sense in the case of a divergent with solid walls, is added the thrust provided by the fan and the thrust produced by the reaction created by the fluid screen. The apparatus may thus be utilised as a lifting or propelling device for any body immersed in a fluid (gaseous or liquid) and especially as a lifting device for aircraft or as a propulsion unit for aircraft having a vertical take-off.

The form of embodiment shown in Fig. 2 only differs from the previous form in that the fan 7 which initiates the flow is of the suction instead of the delivery type, and is arranged on the downstream side of the fluid divergent, preferably inside a cylindrical casing 8 which encloses this divergent. This casing facilitates the starting up of the system and improves the protection of the screw.

In the alternative form shown in Fig. 3, the fan is replaced by an auxiliary jet discharged from a nozzle 9 arranged in this example in the axis of the convergent 1. In the same way as the fan of the example shown in Fig. 2, the nozzle 9 could be placed at the outlet of the fluid divergent, and preferably in a cylindrical casing such as 8.

Fig. 4 shows a simplified solution in which neither fan nor auxiliary jet are provided, the flow of fluid in the interior of the solid convergent and the fluid divergent being obtained by the effect only of the entrainment produced by the fluid screen due to friction and viscosity. The overall efficiency is lower, but simplicity is developed to the maximum extent.

In addition, it is possible to arrange a number of stages, one following the other as shown in Fig. 5; the convergents of these stages $e_1$, $e_2$, $e_3$ . . . have increasing diameters so that the fluid screen of each of them penetrates into that following and entrains the air in it by its external surface.

Fig. 6 shows a further form of embodiment comprising a connection in series of two convergents $1a$, $1b$, each followed by its fluid screen $6a$, $6b$. The second convergent $1b$ receives the flow channeled by the fluid screen $6a$ of the first, the speed of which is already reduced. It again increases this speed and the thrusts produced on the two convergents which are both coupled to the same moving system are additive in their effect on this system. The number of apparatus which can be placed in series has no other limit than the losses by irreversible transformation to heat. In the first convergent, the speed of flow may be increased by means of an auxiliary nozzle 9 or by a fan, or again an auxiliary jet or a suction fan may be provided on the downstream side of the last convergent, following an arrangement similar to that of Fig. 2, or alternatively in a zone intermediate between two convergents.

In all the examples given, the convergent can of course have any desired shape other than a revolution, which will be extended by the fluid screen discharged from the nozzle in the form of a slot which surrounds the neck of the convergent.

Thus Figs. 7 and 8 show an apparatus in which the convergent has a rectangular cross-section, Fig. 7 being a cross-section through a plane parallel to the small sides of the rectangle and Fig. 8 a view in elevation and in projection on a plane parallel to the large side of the rectangle. Parallel to the small sides, the convergent and the fluid screen are limited in this example by two parallel panels 11. Other forms adapted to the applications considered can also be constructed.

The fluids, both that of the divergent screen and that of the main flow, may be gases or liquids in accordance with the applications considered, or again the apparatus may be of the mixed type, using for example a liquid screen and a gaseous main flow or vice-versa.

In order to orientate the fluid screen satisfactorily and to feed it in a suitable manner, a nozzle device of the type shown in Fig. 9 may be employed, comprising a number of parallel slots separated from each other by flat planes 12 situated at small intervals. In this way, a screen can be obtained which is relatively thick at the origin while at the same time it is well directed.

In Figs. 10 and 11 there is shown at 21 the fuselage of a two-engine aircraft and at 22 one of the wings carrying one of the engine cowlings 23 with its air-screw 24. Along the extrados of each wing and at a small distance above the wing is mounted an auxiliary profile 25 which extends between the fuselage 21 and the extremity 26 of the wing where it is suitably supported; the extremity of the wing may, for example, be folded back upwards as shown in Fig. 11 so as to be coupled to the profile 25.

This profile forms between itself and the wing a slot 27 which converges towards the rear as shown in Fig. 10. The said profiled member is hollow and terminates towards the rear in a longitudinal slot 28 which discharges as near as possible to the physical neck formed between the said profile 25 and the wing 22. This slot 28 is directed in such manner that the flat fluid jet or screen $v$ which is discharged from it when the internal space of the profile 25 is supplied with fluid under pressure from a suitable source, is orientated following a direction $\alpha$ with respect to the tangential plane $ct$ at the extrados of the wing along the neck $c$; the angle $\alpha$ is such that the fluid screen is divergent with respect to the extrados.

The operation is as follows: when the screen $v$ issuing from the slot 28 is in action and the ambient air circulates between the profile 25 and the wing 22, the static pressure of this air, which is equal to the atmospheric pressure on the upstream side, falls rapidly in the vicinity of the neck at which its value is a minimum. This depression with respect to atmospheric pressure is applied over the surfaces of the profile and of the wing in the vicinity and on the upstream side of the neck $c$ and, by reason of the orientation of these surfaces, produces a propulsive component of thrust.

On the downstream side of the neck, the ambient air which has passed through the neck $c$ becomes recompressed in the divergent formed between the extrados of the wing and the screen $v$, and this air returns slowly to atmospheric pressure. The difference in pressure on the two sides of the fluid screen is balanced by the centrifugal forces due to the curvature assumed by the screen under the action of this same depression. The difference in pressure between the two faces $f_1$ and $f_2$ of the wing on the downstream side of the neck $c$ produces lifting forces at the extrados.

The atmospheric air which passes through the neck may be set in motion by the action of the fluid screen itself when the angle $\alpha$ is not too great, or by any other means. If the air-screw 24 of the aircraft is in action, it increases the rate of flow of atmospheric air in the slot 27. The angle $\alpha$ can thus be increased and it may have values even up to a right angle if the effect of the fluid screen is to be applied whilst the air-screw is driven by its engine.

For the same rate of flow of air through the neck $c$, the lifting force is proportional to the momentum of the fluid screen (the product of the output-mass of this screen and its speed of ejection from the slot 28).

The stabilisation of the aircraft may be effected in the following manner:

(a) for rolling, by variation of the momentum of the fluid screen on either of the wings, or alternatively by a differential variation of the angle α acting on the rates of flow of induced air.

To this end, a part of the profile 25, located for example between the engine cowling 23 of the extremity 26 of the wing may be made movable in rotation about an axis substantially coincident with the slot 27 itself, this rotation being controlled by the piloting system of the aircraft;

(b) for pitching, by longitudinal displacement of the profile 25 with respect to the wing, which displaces the centre of thrust with respect to the centre of gravity, or alternatively by arranging an adjustable lift device as far removed as possible from the centre of gravity, this device being constituted for example by a known means such as a vertical jet, an auxiliary airscrew with a vertical shaft, etc., or again by a fluid screen device similar to that described above for the wing, but applied to the horizontal tail unit of the aircraft.

As far as the first embodiment is concerned (longitudinal displacement of the profile member 25) the portion of the profile 25 situated between the fuselage 21 and the engine cowling 23 may be guided for example at its extremities in slides such as 26a (see Fig. 10) formed on the fuselage and on the engine cowling and adapted to guide the profile 25 parallel to the tangential plane c, t, the displacement of the profile being controlled by the piloting system of the aircraft by means of a suitable transmission, for example formed by a rotating shaft parallel to the profile 25, mounted inside the wing and coupled to the profile member by levers. The supply of auxiliary fluid to the profile member may be effected by means of a flexible tube in the interior of the fuselage. A plate 26b, fixed to each extremity of the moving portion of the profile member, enables the hole in the fuselage and in the engine cowling to be closed.

Figs. 12 and 13 show an application similar to that previously described, but comprising a number of auxiliary profile members 25a, 25b, 25c, arranged parallel and above the extrados of the wing so as to form a number of fluid screens $v_a$, $v_b$, $v_c$ and a number of necks following one after the other. The necks corresponding to these successive auxiliary profiles 25a, 25b, 25c have increasing sections in order that the fluid screen from each one of them penetrates at least in part into that following and drives the air along with it.

Finally, the trailing edge of the wing is itself provided with a blowing slot 29 adapted to form a screen $v_d$ which diverges with respect to the screen $v_c$ of the last auxiliary profile 25c, that is to say in this case directed downwards. The fluid divergent produced between the screens $v_c$ and $v_d$ completes the coupling of the pressure between the screens with the atmospheric pressure, and gives a better efficiency than if one of these walls were solid. It thus increases the rate of flow of air induced by the screens and again reduces its pressure along the wing, which increases the effect of lift.

In this example again, the wing is not bent over at its extremity as in Fig. 11, and a surface 30, normal to the wing and to the auxiliary profile serves as a keeper plate, preventing the lateral entry of air.

The device may also be applied to a section other than the profile of a wing, for example to the extrados of an aircraft fuselage.

Figs. 14 and 15 show an example of construction in which the lift obtained by the apparatus serves essentially to lift the aircraft on which it is fitted. This aircraft 31 is in this case circular as is also the hollow auxiliary profile member 32 and the ejection slot 33 of the fluid screen.

The auxiliary fluid under pressure is created in the interior of the apparatus 31 and is led into the profile member 32 through the arms 34 which support this member. A fan 35 with a vertical axis driven by a motor mounted inside the aircraft 31, serves to increase the speed of the air which passes between the profile 32 and the body 31 of the aircraft. The depression which is produced at the annular neck between the profile 32 and the aircraft creates the lift.

In the preceding forms of construction, the convergent remains the seat of a thrust directed along its axis. This thrust may balance wholly or in part, or may even exceed the component of drag of the thrust utilisable as a lifting force applied to the physical portion of the divergent, this component being due to the actual inclination of the divergent with respect to the mean axis of the induced fluid.

In the form of embodiment shown in Figs. 16 and 17, the hollow body 36 which carries the election slot 37 of the fluid screen is associated with a solid wall 38 having a curvature such that the space between the fluid screen and this wall first of all decreases and then increases. A neck is thus formed at a point c between the solid wall and the fluid screen, this neck being preceded by a convergent, the wall of which is formed in part by the fluid screen. The depression applied by the main flow of fluid, flowing between the solid wall 38 and the fluid screen, to the said solid wall on the upstream side of the neck, may thus be utilised in order to create a thrust on the wall 38.

In the figures, the body 38 is assumed to be cylindrical with a circular cross-section, but it could be given other shapes. This body 38 may constitute a horizontal appendage for an aircraft 39 intended to take-off vertically, such appendages being distributed if necessary all round the axis a—a of the aircraft.

The cylinder 38 can preferably be itself provided with one or a number of auxiliary blowing orifices 40 substantially tangential to its wall and directed so as to induce around the cylinder a circulation in the same direction as that produced by the fluid screen. The interaction between these fluid jets and the fluid screen may be regulated by an orientation of the cylinder 38 which is made rotatable about its axis and is coupled to a regulating control, comprising for example a tangent screw and a toothed wheel coupled to the cylinder inside the fuselage. The auxiliary blowing slots 40 could also be replaced simply by a continuous rotation of the cylinder about its axis, in the same direction as with the blowing slots, this rotation being maintained either by the simple action of the fluid screen issuing from 37, or by means of a motor.

What I claim is:

1. A jet augmenter comprising a convergent duct bounded by a physical wall and a divergent duct bounded by a fluid wall extending from said physical wall, means for forming said fluid wall comprising nozzle means extending along and outside the periphery of the downstream end of the said convergent duct, the said nozzle means opening in a direction which diverges from the axis of the said duct, and means for supplying the said nozzle means with gas at a substantial overpressure in relation to the ambient medium, whereby a fluid jet issues from the said nozzle means and forms said fluid wall.

2. Jet augmenter as claimed in claim 1, comprising further jet forming means operatively associated with the convergent duct to form therewith an injector adapted to suck up ambient fluid.

3. Jet augmenter as claimed in claim 1, comprising further a physical wall extending downstream from the convergent duct and substantially surrounding the fluid wall.

4. Jet augmenter as claimed in claim 3, wherein the physical wall extending around the fluid wall forms a convergent duct.

5. Jet augmenter as claimed in claim 1, comprising a cascade of convergent duct and nozzle means assemblies in coaxial relation and of increasing diameters.

6. Jet augmenter as claimed in claim 1 comprising an impellor adapted to promote a flow through the solid-fluid convergent-divergent duct.

7. Jet augmenter as claimed in claim 6, wherein the impellor is housed within the convergent duct.

8. Jet augmenter as claimed in claim 6, wherein the impellor is a ducted impellor arranged downstream of the solid-fluid convergent-divergent duct.

9. Jet augmenter as claimed in claim 1, wherein a portion of the solid wall of the convergent duct is a part of the upper surface of an aircraft wing, the nozzle means extending spanwise above the said surface.

References Cited in the file of this patent

UNITED STATES PATENTS

| | | |
|---|---|---|
| 1,382,535 | Offen | June 21, 1921 |
| 1,876,472 | Schweisthal | Sept. 6, 1932 |
| 2,302,925 | Von Schlippe | Nov. 24, 1942 |
| 2,703,959 | Wetherbee | Mar. 15, 1955 |
| 2,791,088 | Rao | May 7, 1957 |